United States Patent
Hou et al.

(10) Patent No.: US 10,789,016 B2
(45) Date of Patent: Sep. 29, 2020

(54) STORAGE SYSTEM AND STORING METHOD

(71) Applicant: Acer Incorporated, New Taipei (TW)

(72) Inventors: Guan-Yu Hou, New Taipei (TW); Tz-Yu Fu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 42 days.

(21) Appl. No.: 16/294,623

(22) Filed: Mar. 6, 2019

(65) Prior Publication Data

US 2019/0278519 A1 Sep. 12, 2019

(30) Foreign Application Priority Data

Mar. 7, 2018 (TW) .............................. 107107766 A

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0685* (2013.01); *G06F 12/10* (2013.01); *G06F 2212/657* (2013.01); *G06F 2212/7201* (2013.01)

(58) Field of Classification Search
CPC .... G06F 3/0659; G06F 3/0601; G06F 3/0685; G06F 12/10–1081; G06F 2212/72–7201; G06F 2212/68–681; G06F 2212/657
See application file for complete search history.

(56) References Cited

U.S. PATENT DOCUMENTS

| | | | | |
|---|---|---|---|---|
| 8,819,367 B1 * | 8/2014 | Fallone | ............... | G06F 11/1456 711/162 |
| 9,213,632 B1 * | 12/2015 | Song | .................. | G06F 12/0246 |
| 10,445,229 B1 * | 10/2019 | Kuzmin | ............... | G06F 3/0638 |
| 2004/0260919 A1 * | 12/2004 | Takahashi | ............ | H04L 69/329 713/2 |

(Continued)

OTHER PUBLICATIONS

J. Hong, S. Han and E. Chung, "A RAM cache approach using host memory buffer of the NVMe interface," 2016 International SoC Design Conference (ISOCC), Jeju, 2016. (Year: 2016).*

(Continued)

*Primary Examiner* — Khoa D Doan
(74) *Attorney, Agent, or Firm* — Birch, Stewart, Kolasch & Birch, LLP

(57) ABSTRACT

A storing method is provided. The storing method includes: receiving a driving instruction by a host, wherein the driving instruction triggers a driver to collect a user information, and the driver generates a hit rate information according to the user information and generates a mapping table according to the hit rate information; receiving the mapping table from the driver by a processing unit of a storage device, wherein the storage device does not have any dynamic random access memory (DRAM); storing the mapping table in a static random access memory (SRAM); storing a plurality of storing data in a number of NAND flash memories, wherein when the host receives an accessing instruction, the processing unit reads the mapping table in the SRAM to find the storing data corresponding to the accessing instruction.

20 Claims, 3 Drawing Sheets

(56) References Cited

U.S. PATENT DOCUMENTS

| | | | |
|---|---|---|---|
| 2012/0210066 A1* | 8/2012 | Joshi | G06F 12/0811 |
| | | | 711/118 |
| 2014/0129760 A1* | 5/2014 | Lee | G06F 12/0246 |
| | | | 711/103 |
| 2014/0215129 A1* | 7/2014 | Kuzmin | G06F 12/0246 |
| | | | 711/103 |
| 2018/0074722 A1* | 3/2018 | Iwai | G06F 12/0246 |
| 2019/0235762 A1* | 8/2019 | Kaburaki | G06F 3/0656 |
| 2020/0026657 A1* | 1/2020 | Franke | G06F 12/1483 |
| 2020/0151109 A1* | 5/2020 | Cho | G06F 12/1009 |

OTHER PUBLICATIONS

Kim et al., "A Space-Efficient Flash Translation Layer for Compactflash Systems", IEEE Transactions on Consumer Electronics, May 2002 vol. 48, No. 2, pp. 366-375.

* cited by examiner

STORAGE SYSTEM AND STORING METHOD

This application claims the benefit of Taiwan application Serial No. 107107766, filed Mar. 7, 2018, the subject matter of which is incorporated herein by reference.

BACKGROUND OF THE INVENTION

Field of the Invention

The invention relates in general to a storage system and the storing method, and more particularly to a storage system and a storing method applicable to a low cost non-volatile memory (NVM) express (NVMe).

Description of the Related Art

The storage device, such as a solid-state drive, is a passive device, which is unable to know what the really important data is in the system. Therefore, during the design of acceleration mechanism, the storage device factory decides which block for storing the data being important to the user or worthy of acceleration according to the statistics of the hit rate of pre-boot authentication (PBA). However, such method is not as good as the system end in finding which data is frequently used by the user. The system end is such as a computer electrically coupled to the solid-state drive.

As the market share of the NVM express (NVMe) grows continuously, the low cost NVMe, which does not have any dynamic random access memory (DRAM), will become more and more popular. However, since the low cost NVMe does not have any DRAM, the efficiency and the access speed of the low cost NVMe is far inferior to the storage device storing the complete mapping table in the DRAM. Therefore, it has become a prominent task to increase the access speed of the low cost NVMe.

SUMMARY OF THE INVENTION

The present invention provides a storage system and a storing method. When the storage device does not have the dynamic random access memory (DRAM) (for example, a low cost NVMe storage device), a mapping table is stored in a static random access memory (SRAM) or an external DRAM. When the host receives an accessing instruction, the mapping table is quickly read from the SRAM or the external DRAM to find the storing data corresponding to the accessing instruction. Thus, the access efficiency of the low cost NVMe storage device can be increased.

According to one embodiment the present invention, a storage system is provided. The storage system includes a host and a storage device. The storage device includes a controller and a number of NAND flash memories. The controller includes a processing unit and a static random access memory (SRAM). The host receives a driving instruction which triggers a driver to collect a user information. The driver generates a hit rate information according to the user information and generates a mapping table according to the hit rate information. The processing unit receives the mapping table from the driver. The NAND flash memories store a number of storing data. The storage device does not have any dynamic random access memory (DRAM). When the host receives an accessing instruction, the processing unit reads the mapping table in the SRAM to find the storing data corresponding to the accessing instruction.

According to another embodiment the present invention, a storing method is provided. The storing method includes: receiving a driving instruction by a host, wherein the driving instruction triggers a driver to collect a user information, and the driver generates a hit rate information according to the user information and generates a mapping table according to the hit rate information; receiving the mapping table from the driver by a processing unit in a storage device, wherein the storage device does not have any dynamic random access memory (DRAM); storing the mapping table in a static random access memory (SRAM); storing a number of storing data in a number of NAND flash memories, wherein when the host receives an accessing instruction, the processing unit reads the mapping table in the SRAM to find the storing data corresponding to the accessing instruction.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
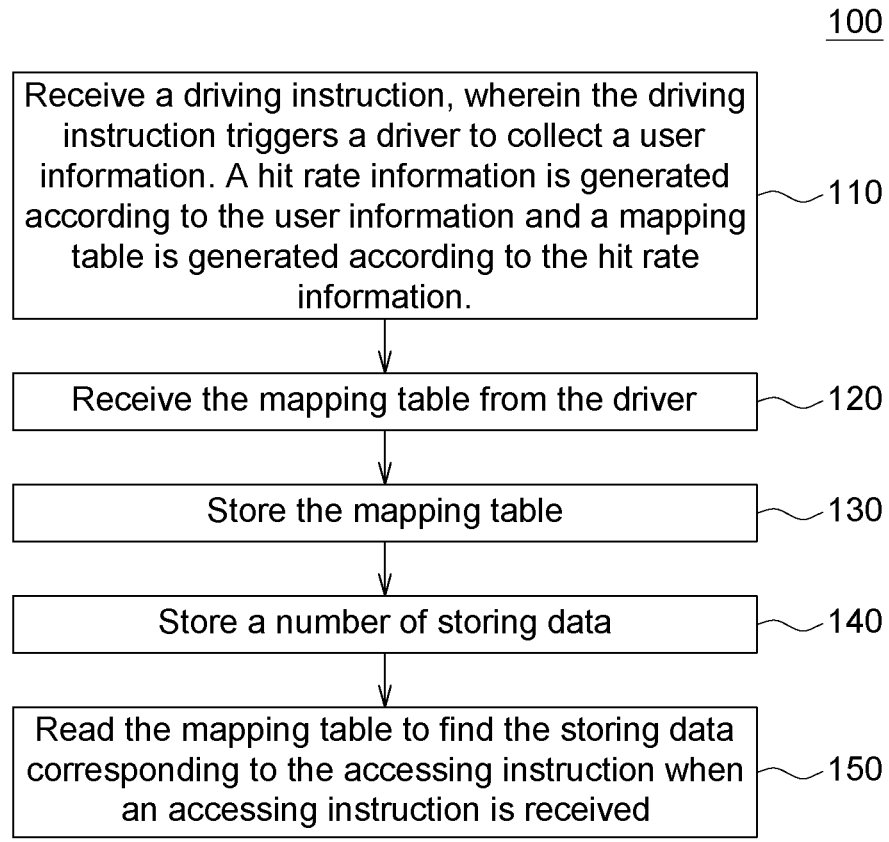
FIG. 1 is a flowchart of a storing method according to an embodiment of the present disclosure.
Figure 2:
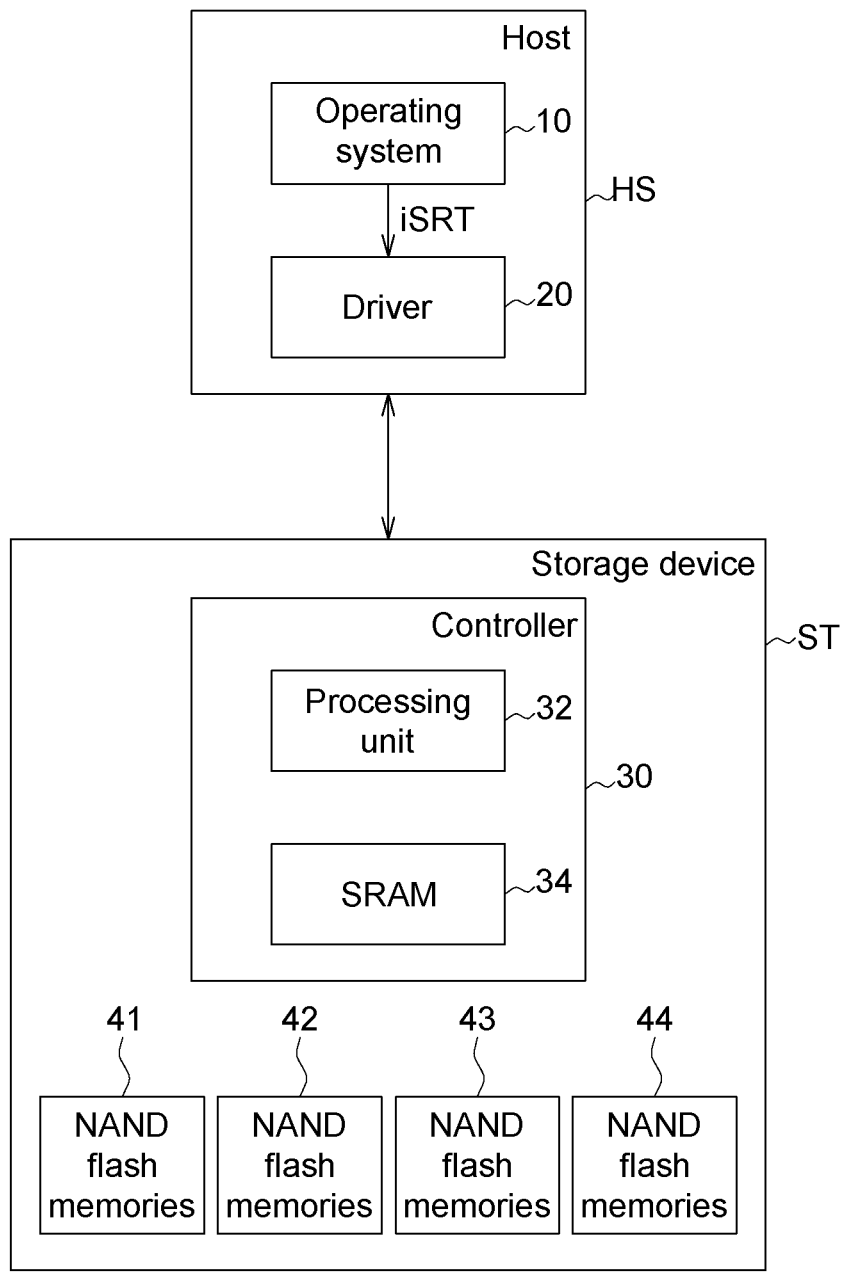
FIG. 2 is a schematic diagram of a storage system according to an embodiment of the present disclosure.

Refer to FIGS. 1-2. FIG. 1 is a flowchart of a storing method 100 according to an embodiment of the present disclosure. FIG. 2 is a schematic diagram of a storage system 200 according to an embodiment of the present disclosure. In an embodiment, the storage system 200 includes a host HS and a storage device ST. The host HS includes an operating system 10 and a driver 20. The storage device ST includes a controller 30 and a number of NAND flash memories 41~44. The controller 30 includes a processing unit 32 and a static random-access memory (SRAM) 34.

In an embodiment, the host HS can be a notebook, a desktop computer, a mobile phone, a tablet or other device with computation function.

In an embodiment, the driver 20 drives the storage device ST to operate. For example, the driver 20 collects the information of the user's behavior. Then, the driver 20 transmits the collected user related information to the storage device ST through a driving instruction. The driver 20 can be implemented by software or firmware.

In an embodiment, the storage device ST is a solid-state drive (SSD).

In an embodiment, the processing unit 32 can be implemented by a microcontroller, a microprocessor, a digital signal processor, an application specific integrated circuit (ASIC) or a logic circuit.

In an embodiment as indicated in FIG. 1, details of the flowchart of the storing method 100 of the present disclosure are disclosed. The components mentioned in the storing method 100 can be implemented by the components mentioned in FIG. 2.

In step110, a driving instruction which triggers a driver 20 to collect a user information is received by a host HS The driver 20 generates a hit rate information according to the user information and generates a mapping table according to the hit rate information.

In an embodiment, the storage device ST is solid state disk or solid state drive (SSD) which does not have any DRAM.

In an embodiment, the user information includes a logic block address (LBA) information. The logic block address information is a general purpose mechanism which describes the blocks where the data is located in the storage device ST. The logic block address information can be the address of a particular data block or the data block to which a particular address points. For example, a particular block in the NAND flash memory 41 in which a particular data is stored can be obtained from the logic block address information.

In an embodiment, the mapping table stores the logic block address information having a larger hit rate (for example, the logic block address information having a hit rate larger than a hit rate threshold). Compared with storing the logic block address information of each block in all of the NAND flash memories 41~44 (globally), the mapping table stores only the logic block address information having a larger hit rate, so the size of the mapping table will not be too large. Normally, the size of the mapping table is only $1/1000$ of all of the NAND flash memories 41~44. For example, the NAND flash memories 41~44 in total have 512GB, and the mapping table occupies only 512MB.

In an embodiment, the driving instruction can be implemented by an Intel smart response technology (iSRT), which is a generally known technology and will not be described in detailed here.

In an embodiment, when the host HT receives a driving instruction from the operating system 10, the operating system 10 sends the driving instruction to the driver 30 to activate a hybrid hinting feature of the NVMe. The hybrid hinting feature refers to the driver 30 sending a conversion instruction to the NVMe to turn off the original acceleration mechanism of the storage device ST and transfer the control authority of the acceleration mechanism to the host HS. Meanwhile, the host HS obtains the control authority of the acceleration mechanism of the storage device ST, and the driver is triggered by the driving instruction to record an input/output information (such as the input/output information regarding the user's access to the storage device ST) for collecting the user information. Thus, the frequently accessed files by the user can be obtained and a hit rate information can be calculated according to the user information. In an embodiment, the hit rate information can be the probability of each block being accessed by the user in each of the NAND flash memories 41~44 (global memory).

In step 120, a mapping table is received from the driver 20 by a processing unit 32 in a storage device ST. The storage device ST does not have any dynamic random access memory (DRAM).

In step 130, the mapping table is stored in a static random access memory (SRAM) 34.

In step 140, a number of storing data are stored in a number of NAND flash memories 41~44.

In an embodiment, step 130 can be performed before step 110, 120 or 130.

In step 150, when the host HS receives an accessing instruction, the processing unit 32 reads the mapping table in the SRAM 34 to find the storing data corresponding to the accessing instruction.

To be more specifically, the driving instruction (for example, an iSRT instruction) is for driving in the host HS end. After the driving instruction is triggered, the driving instruction sends a conversion instruction to the storage device ST to activate the hybrid hinting feature of NVMe. Meanwhile, the NVMe turns off the acceleration mechanism of the NVMe. In the present example, the storage device ST does not have any DRAM. For example, the storage device ST is low cost NVMe storage device. After the required size of the mapping table is estimated through the driving instruction (such as an iSRT instruction) by sending a request for using the internal SRAM 34 to the NVMe, the acceleration function is controlled by the host HS end. Then, whenever the mapping table is updated, the driver 20 transmits the updated logic block address information to the NVMe, obtains a corresponding updated mapping table through the mechanism of the internal flash translation layer (FTL) and stores the corresponding updated mapping table in the internal SRAM 34.

In an embodiment, the accessing instruction can be a read instruction or a write instruction triggered by the user through the operating system 10.

In an embodiment, when the storage device ST has a DRAM whose access speed is double of the speed of the NAND flash memories 41~44. However, in actual application, there is no need to accelerate all spaces of the memories. Only frequently used data, the necessary files for the system and/or the random data required for system boot need to be accelerated. The memory space for storing these data is normally less than 10GB. Since the mapping table only stores the logic block address information which has a larger hit rate (that is, the logic block address of the frequently accessed data in the NAND flash memories 41~44), only about 10MB memory space is needed to perform acceleration by using the mapping table. Besides, the storing method 100 as indicated in FIG. 1 is a method for accelerating the access speed of the storage system 100 when the storage device ST does not have any DRAM. The SRAM 34 of a general storage device ST (for example, a solid-state drive) normally has about 32MB memory space, which are sufficient for storing the mapping table. Since the mapping table only stores the logic block address information which has a larger hit rate, the host HS end has a larger probability of quickly finding the corresponding necessary logic block address from the mapping table. Thus, the access speed of the storage system 100 can be accelerated when the storage device ST does not have any DRAM.

Figure 3:
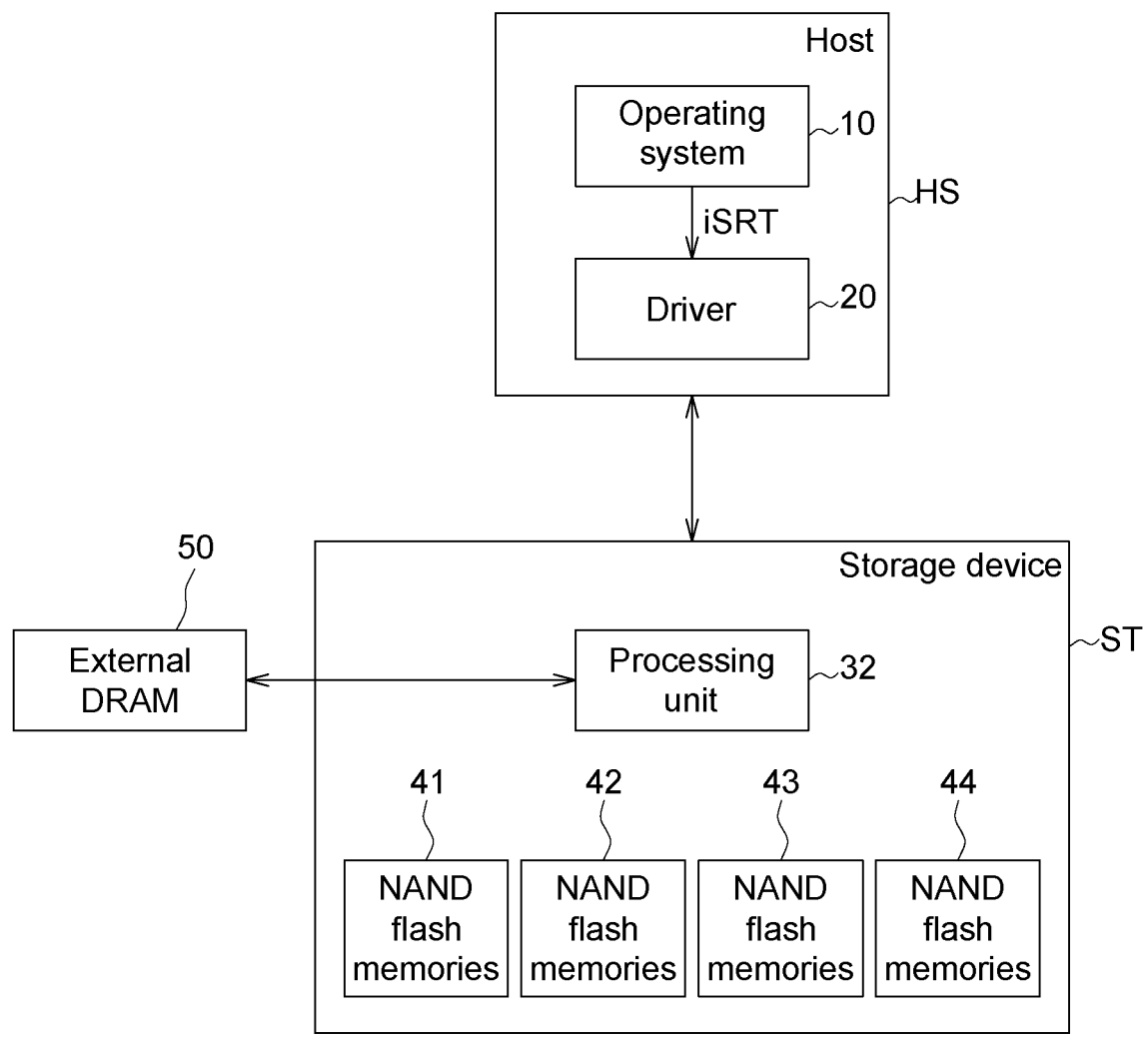
FIG. 3 is a schematic diagram of a storage system according to an embodiment of the present disclosure.

Referring to FIG. 3, a schematic diagram of a storage system 300 according to an embodiment of the present disclosure is shown. In an embodiment, the storage system 300 includes a host HS and a storage device ST. The host HS includes an operating system 10 and a driver 20. The storage device ST includes a processing unit 32 and a number of NAND flash memories 41~44. The controller 30 includes a processing unit 32 and an SRAM 34.

In the present embodiment, the storage device ST supports the host memory buffer (HMB) function, the storage system 300 further includes an external DRAM 50 communicatively coupled to the storage device ST through an NVM express (NVMe) interface, and the processing unit 32 transmits the mapping table to the external DRAM 50 and the mapping table is stored in the external DRAM 50. When the host HS receives the accessing instruction, the processing unit 32 reads the mapping table in the external DRAM to find the storing data corresponding to the accessing instruction.

To be more specifically, the driving instruction (for example, an iSRT instruction) is for driving in the host HS end. After the driving instruction is triggered, the driving instruction sends a conversion instruction to the storage device ST to activate the hybrid hinting feature of NVMe. Meanwhile, the NVMe turns off the acceleration mechanism of the NVMe. In the present example, the storage system 300 is a platform supporting the HMB. After the host HS end estimates the required size of the mapping table through the driving instruction, the storage device ST sends a request for using the DRAM to the NVMe. When the NVMe supports the HMB function, the host HS end has the authority to use the space of the DRAM of the storage system 300 (the DRAM can be externally connected to the storage device ST or located in the host HS) for storing the corresponding mapping table needed for the host HS end. Then, whenever the mapping table is updated, an instruction is sent to the NVMe through the driving instruction (for example, an iSRT instruction) to update the mapping table. Meanwhile, the driver 20 transmits the updated logic block address information to the NVMe, obtains a corresponding updated mapping table through the translation mechanism of the internal flash translation layer (FTL), and stores the corresponding updated mapping table in the external DRAM 50.

To summarize, the storage system and the storing method of the present disclosure are capable of storing the mapping table in the SRAM or the external DRAM when the storage device does not have any DRAM (such as a low cost NVMe storage device). When the host receives an accessing instruction, the mapping table is quickly read from the SRAM or the external DRAM to find the storing data corresponding to the accessing instruction. Thus, the access efficiency of the low cost NVMe storage device can be increased.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A storage system, comprising:
a host, configured to receive a driving instruction to trigger a driver to collect a user information, wherein the driver generates a hit rate information according to the user information and generates a mapping table according to the hit rate information; and
a storage device, comprising:
a controller, comprising:
a processing unit, configured to receive the mapping table from the driver; and
a static random access memory (SRAM) configured to store the mapping table; and
a plurality of NAND flash memories configured to store a plurality of storing data;
wherein the storage device does not have a dynamic random access memory (DRAM), and when the host receives an accessing instruction, the processing unit reads the mapping table in the SRAM to find the storing data corresponding to the accessing instruction.

2. The storage system according to claim 1, wherein the user information comprises a logic block address (LBA) information, and the storage device is a solid-state drive (SSD).

3. The storage system according to claim 1, wherein the driver is configured to execute a conversion instruction, the conversion instruction is configured to turn off the original acceleration mechanism of the storage device and transfers the control authority of the acceleration mechanism to the host.

4. The storage system according to claim 1, wherein the driver records an input/output information for collecting the user information.

5. The storage system according to claim 1, wherein when the storage device supports the host memory buffer (HMB) function, the storage system further comprises:
an external DRAM communicatively coupled to the storage device through an NVM express (NVMe) interface, wherein the processing unit is configured to transmit the mapping table to the external DRAM and store the mapping table in the external DRAM;
wherein when the host receives the accessing instruction, the processing unit is configured to read the mapping table from the external DRAM to find the storing data corresponding to the accessing instruction.

6. The storage system according to claim 1, wherein the mapping table stores a logic block address information having a hit rate larger than a hit rate threshold.

7. The storage system according to claim 6, wherein the logic block address information is the address of a particular data block or the data block to which a particular address points.

8. The storage system according to claim 1, wherein when the mapping table is updated, a corresponding updated mapping table is obtained through a mechanism of an internal flash translation layer (FTL).

9. The storage system according to claim 1, wherein the accessing instruction is a read instruction or a write instruction triggered by a user through an operating system.

10. The storage system according to claim 1, wherein the host is a notebook, a desktop computer, a mobile phone, a tablet or a device with computation function.

11. A storing method, comprising:
receiving a driving instruction by a host, wherein the driving instruction triggers a driver to collect a user information, and the driver generates a hit rate information according to the user information and generates a mapping table according to the hit rate information;
receiving the mapping table from the driver by a processing unit in a storage device, wherein the storage device does not have a dynamic random access memory (DRAM);
storing the mapping table in a static random access memory (SRAM);
storing a plurality of storing data in a plurality of NAND flash memories;
wherein when the host receives an accessing instruction, the processing unit reads the mapping table in the SRAM to find the storing data corresponding to the accessing instruction.

12. The storing method according to claim 11, wherein the user information comprises a logic block address (LBA) information, and the storage device is a solid-state drive (SSD).

13. The storing method according to claim 11, further comprises:
executing a conversion instruction by the driver, wherein the conversion instruction is configured to turn off the original acceleration mechanism of the storage device and transfers the control authority of the acceleration mechanism to the host.

14. The storing method according to claim 11, wherein the driver records an input/output information for collecting the user information.

15. The storing method according to claim 11, wherein when the storage device supports the host memory buffer (HMB) function, the storing method further comprises:
    transmitting the mapping table to an external DRAM and storing the mapping table in the external DRAM by the processing unit, wherein the external DRAM is communicatively coupled to the storage device through an NVM express (NVMe) interface;
    wherein when the host receives the accessing instruction, the processing unit reads the mapping table in the external DRAM to find the storing data corresponding to the accessing instruction.

16. The storing method according to claim 11, wherein the mapping table stores a logic block address information having a hit rate larger than a hit rate threshold.

17. The storing method according to claim 16, wherein the logic block address information is the address of a particular data block or the data block to which a particular address points.

18. The storing method according to claim 11, wherein when the mapping table is updated, a corresponding updated mapping table is obtained through a mechanism of an internal flash translation layer (FTL).

19. The storing method according to claim 11, wherein the accessing instruction is a read instruction or a write instruction triggered by a user through an operating system.

20. The storing method according to claim 11, wherein the host is a notebook, a desktop computer, a mobile phone, a tablet or a device with computation function.

\* \* \* \* \*